United States Patent [19]

Everett, Jr.

[11] Patent Number: 4,902,887

[45] Date of Patent: Feb. 20, 1990

[54] OPTICAL MOTION DETECTOR DETECTING VISIBLE AND NEAR INFRARED LIGHT

[75] Inventor: Hobart R. Everett, Jr., San Diego, Calif.

[73] Assignee: The United States of America as represented by the Secretary of the Navy, Washington, D.C.

[21] Appl. No.: 359,249

[22] Filed: May 31, 1989

[51] Int. Cl.$^4$ .......................... G01V 9/04; G01J 1/00

[52] U.S. Cl. .......................... 250/221; 250/338.1; 340/565

[58] Field of Search .................... 250/221, 222.1, 338, 250/342; 340/555-557, 565, 567

[56] References Cited

U.S. PATENT DOCUMENTS

| | | | |
|---|---|---|---|
| 3,379,830 | 4/1968 | Menke | 250/339 |
| 3,549,892 | 5/1969 | Perlman | 250/214 R |
| 3,745,550 | 7/1973 | Anthony et al. | 340/555 |
| 3,789,384 | 1/1974 | Akers | 250/221 |
| 3,848,129 | 11/1974 | Figler et al. | 250/339 |
| 3,931,521 | 1/1976 | Cinzori | 250/349 |
| 4,032,777 | 6/1977 | McCaleb | 250/221 |
| 4,112,300 | 9/1978 | Hall, Jr. et al. | 250/342 |
| 4,242,670 | 12/1980 | Smith | 340/555 |
| 4,258,351 | 3/1981 | Shigeta et al. | 340/556 |
| 4,272,762 | 6/1981 | Geller et al. | 340/556 |
| 4,570,157 | 2/1986 | Kodaira | 340/567 |
| 4,618,770 | 10/1986 | Maile | 340/567 |
| 4,663,521 | 5/1987 | Maile | 250/221 |
| 4,746,910 | 5/1988 | Pfister et al. | 340/567 |
| 4,752,768 | 6/1988 | Steers et al. | 250/221 |
| 4,764,755 | 8/1988 | Pedtke et al. | 340/567 |

*Primary Examiner*—David C. Nelms
*Assistant Examiner*—Stephone B. Allen
*Attorney, Agent, or Firm*—Harvey Fendelman; Thomas Glenn Keough; Michael A. Kagan

[57] ABSTRACT

An optical motion detector detects changes in scene lighting indicative of motion and is also capable of detecting surveillance by active night vision devices using near-infrared light. The detector includes two photodetectors which each provide data to a signal processing network. One photodetector is sensitive to visible light; the other is sensitive to near-infrared light. Both signal processing networks are identical and include a sample-and-hold, a comparator network, and a pulse stretcher. The output of a photodetector is provided to the sample-and-hold and comparator network. The comparator network compares a voltage corresopnding to the instantaneously detected ambient lighting scene with a voltage corresponding to a reference lighting scene. The pulse stretcher receives the output of the comparator network and in turn provides an output to a logical processor. The logical processor compares the outputs of both signal processing networks and provides an output indicating surveillance with near-infrared light. The logical processor also indicates any perturbations in the intensities of incandescent and fluorescent light.

27 Claims, 3 Drawing Sheets

OPTICAL MOTION DETECTOR DETECTING VISIBLE AND NEAR INFRARED LIGHT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to the field of optical motion detectors and more particularly to detecting motion with the ability to distinguish among incandescent, fluorescent, and near-infrared ambient lighting conditions.

There are many benefits afforded by the application of automation in the physical security and surveillance role. The advantages of a system that will not tire, become distracted, frightened, or even subversive are obvious. Potential functions assigned to an automated system can be categorized into three general areas: (1) detection, (2) verification, and (3) assessment. Detection is readily addressable by a multitude of commercially available sensors which can detect, for example, vibration, heat, sound, light, and motion. Verification involves evaluating the outputs of multiple sensors to lessen the probability of a false alarm. The assessment function responds to data provided by the sensors to ascertain the nature of the disturbance, usually in order to determine if a response is necessary.

The types of sensors employed in an automated security system are dependent upon the specific application. Such sensors include those specifically configured to detect intruders. Intrusion is most easily recognized through the use of some type of motion detection scheme; several exist.

A very simple type of passive motion detector responds to changes in background light level. One such detector is a Sprague D-1072 which is a 16 pin DIP (dual inline package) integrated circuit which incorporates a built-in lens that enable it to receive data within a cone-shaped detection field. After a brief settling period upon power-up, the D-1072 adjusts itself to ambient light conditions and establishes a reference condition. Any subsequent deviations from that reference will result in an alarm output. The low cost and directional field-of-view of that device allow them to be arrayed in order to establish unique detection zones which can pinpoint the relative position of a suspected security violation. The ability to provide geometric resolution of the intruder's position can be invaluable in tailoring an appropriate response in minimal time.

However, the D-1072 suffered two significant drawbacks which limited its utility and contributed to its eventual discontinuation. The current consumption of the device is in excess of 200 milliamps per unit, which is too large for practical battery powered operation. Also, it responded only to visible light. Furthermore, the D-1072 was incapable of sensing near-infrared light of the optical spectrum. Therefore, an intruder using an active-source night vision device would not trigger an alarm even if the night vision illumination source was directed at the sensor at point blank range. There are no systems in place even today at high security facilities employing elaborate automated security systems which warn that an area is being illuminated with near-infrared light.

Thus, a need exists for an optical motion detector which can detect surveillance by night vision devices.

SUMMARY OF THE INVENTION

The present invention overcomes the shortcomings of the prior art by providing a low power optical motion detector which is also capable of detecting surveillance of an area by active night vision devices. The low power draw of the present invention is approximately 25 milliamps, which makes it suitable for remote, mobile, or robotic applications. These performance advantages are achieved as a result of the unique configuration of the present invention which includes two detectors sensitive to different portions of the light spectrum which provide separate voltage outputs to a signal processing network. One detector is responsive to visible light; the other detector responds to near-infrared light. The output of each detector is functionally related to the intensity of light detected. Outputs of the signal processing networks are received by a logic processor which compares and analyzes the inputs in order to output information of an intruder alert, and identifies the nature of the perturbated light in terms of the general region of the light spectrum with which it is associated.

Each signal processing network also includes a low pass filter connected to receive the output of a detector which blocks detector outputs having frequencies slightly less than 40 Hz or higher. The output of the low pass filter is provided to a sample-and-hold and to a first input of a voltage comparator network. The output of the sample-and-hold is directed to a second input of the comparator network. The sample-and-hold stores a voltage, used as a reference, corresponding to the detected ambient lighting having the greatest intensity. The comparator network compares the voltage corresponding to the instantaneously detected scene light with the reference voltage. If the difference between the reference and instantaneously detected voltages exceeds a predetermined limit, $\epsilon$, then the output of the comparator network goes low. In this circumstance, the output of the pulse stretcher also goes low, causing the pulse stretcher to provide a pulse into the logical processor. When the logic processor receives a pulse from either signal processing network, it provides an intruder alert warning. When the logic processor receives a pulse from both signal processing networks so that the outputs of the pulse stretchers are both simultaneously low, the logic processor provides a warning of an intruder alert detected under incandescent lighting conditions. The logic processor also provides an output indicating whether an intruder alert is detected with infrared or fluorescent light, and also provides a warning if the security area is being illuminated with near-infrared light.

Thus, one object of the present invention is to provide an optical motion detector which operates with a low current draw. Another object of the present invention is to provide an optical motion detector which can detect surveillance by near-infrared light generating devices. A further object of the present invention is to provide an optical motion detector which can identify a changing incandescent lighting background scene.

DESCRIPTION OF THE PREFERRED EMBODIMENTS

Figure 1:
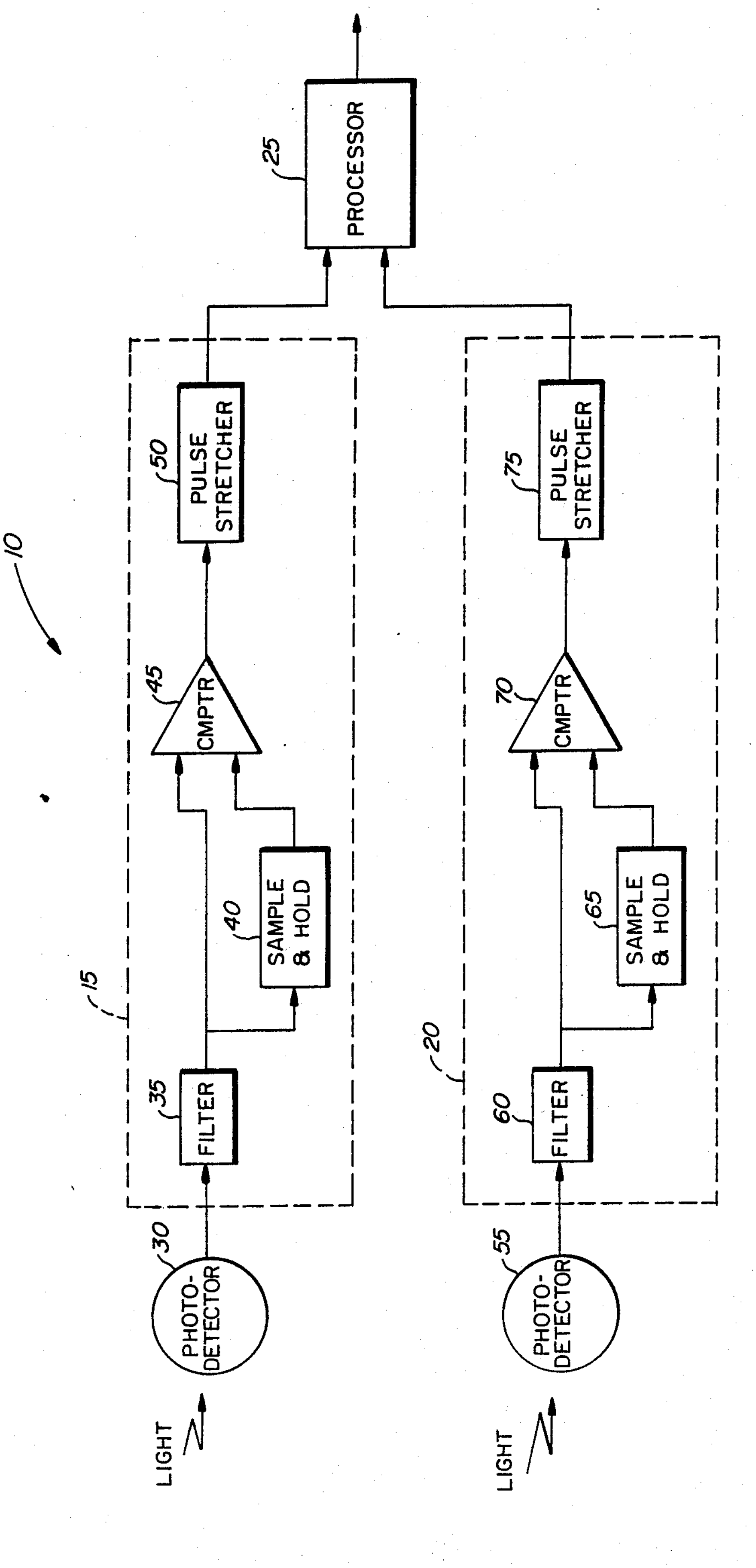
FIG. 1 is a block diagram of the present invention.

Referring to the drawing wherein like reference numerals designate like or similar parts throughout the several views, there is illustrated in FIG. 1 a block diagram of motion detector 10 having signal processing networks 15 and 20, logic processor 25, and detectors 30 and 55.

Detectors 30 and 55 provide voltage outputs that are functionally related to the intensity of the instantaneously detected light illuminating them. Detector 30 is a photodetector sensitive to visible light and insensitive to near-infrared light and may be a cadmium sulphide photocell such as Radio Shack Model No. 276–116. Detector 55 is a photodetector sensitive to near-infrared light and insensitive to visible light. References to visible light are directed to light having a wavelength between 400 and 800 nanometers. References to near-infrared light are directed to light having a wavelength greater than 800 nanometers. Detector 55 may be a silicon pin photodiode such as Radio Shack Model No. TIL413. However, it is to be understood that the scope of the present invention includes the use of detectors other than those specified above. For example, detectors 30 and 55 may be implemented as pin photodiodes, phototransistors, or silicon solar cells utilized in conjunction with appropriate optical filters. An optical filter used in conjunction with detector 30 must be transparent to visible light and opaque to near-infrared light. Likewise, an optical filter used in conjunction with detector 55 must be transparent to near-infrared light and opaque to visible light. Such optical filters are well known and are commercially available. Substitution of pin photodiodes, phototransistors, or silicon solar cells for photodetectors 30 and 55 is well within the level of ordinary skill of those who practice in this art.

The output of detector 30 is directed to low pass filter 35 of signal processing network 15, which also includes sample-and-hold 40, comparator network 45, and pulse stretcher 50. Filter 35 blocks outputs of detector 30 having frequencies slightly less than 40 Hz or higher in order to avoid the effects of any nearby 60 Hz commercial power, fluorescent lights, and other high frequency noise. Limiting the frequencies that will produce an intruder alert increases the probability that the low frequency perturbations are induced by intruder motion. The output of low pass filter 35 is provided to sample-and-hold 40 and as a first input to voltage comparator network 45. The output of sample-and-hold 40 is provided as the second input to comparator network 45. Sample-and-hold 40 stores a voltage, which serves as a reference, functionally related to the ambient light detected by detector 30 having the greatest intensity. The instantaneous voltage output of detector 30 is stored as a reference voltage by sample-and-hold 40 whenever it exceeds the immediately preceding voltage stored by sample-and-hold 40. The instantaneous voltage output of detector 30 is less than the voltage stored by sample-and-hold 40 when the intensity of the detected light diminishes, a strong indication of an intrusion. Comparator network 45 compares the voltage output of detector 30 with the reference voltage from sample-and-hold 40.

The voltage output of comparator network 45 is provided to pulse stretcher 50 which in turn provides an output to logic processor 25. When the difference between the voltage output of detector 30 and voltage stored by sample-and-hold 40 is less than a predetermined limit, $\epsilon$, the output of comparator network 45 is an open circuit, which is considered a logic "high". When the voltage output of comparator network 45 is "high", the voltage output of pulse stretcher 50 is "high". If the difference between the reference and detector output voltages exceeds $\epsilon$, the output of comparator network 45 changes to 0 vdc, which is a logic "low", causing the output of pulse stretcher 50 to also be 0 vdc, or "low".

Signal processing network 20 is identical to signal processing network 15. However, signal processing network 20 receives an output from detector 55 rather than from detector 30.

Logic processor 25 is disposed to receive any outputs of signal processing networks 15 and 20 from pulse stretchers 50. At steady-state lighting background conditions, the output states of pulse stretchers 50 of signal processing networks 15 and 20 are high. If the output state of signal processing network 15 alone goes low, logic processor 25 provides an output indicating an intrusion detected with fluorescent light. If the output state of signal processing network 20 alone goes low, logic processor 25 provides an output indicating surveillance of the security area with near-infrared light. If the output of signal processing networks 15 and 20 both go low simultaneously, logic processor 25 provides an output indicating an intrusion detected with incandescent light.

Figure 2:
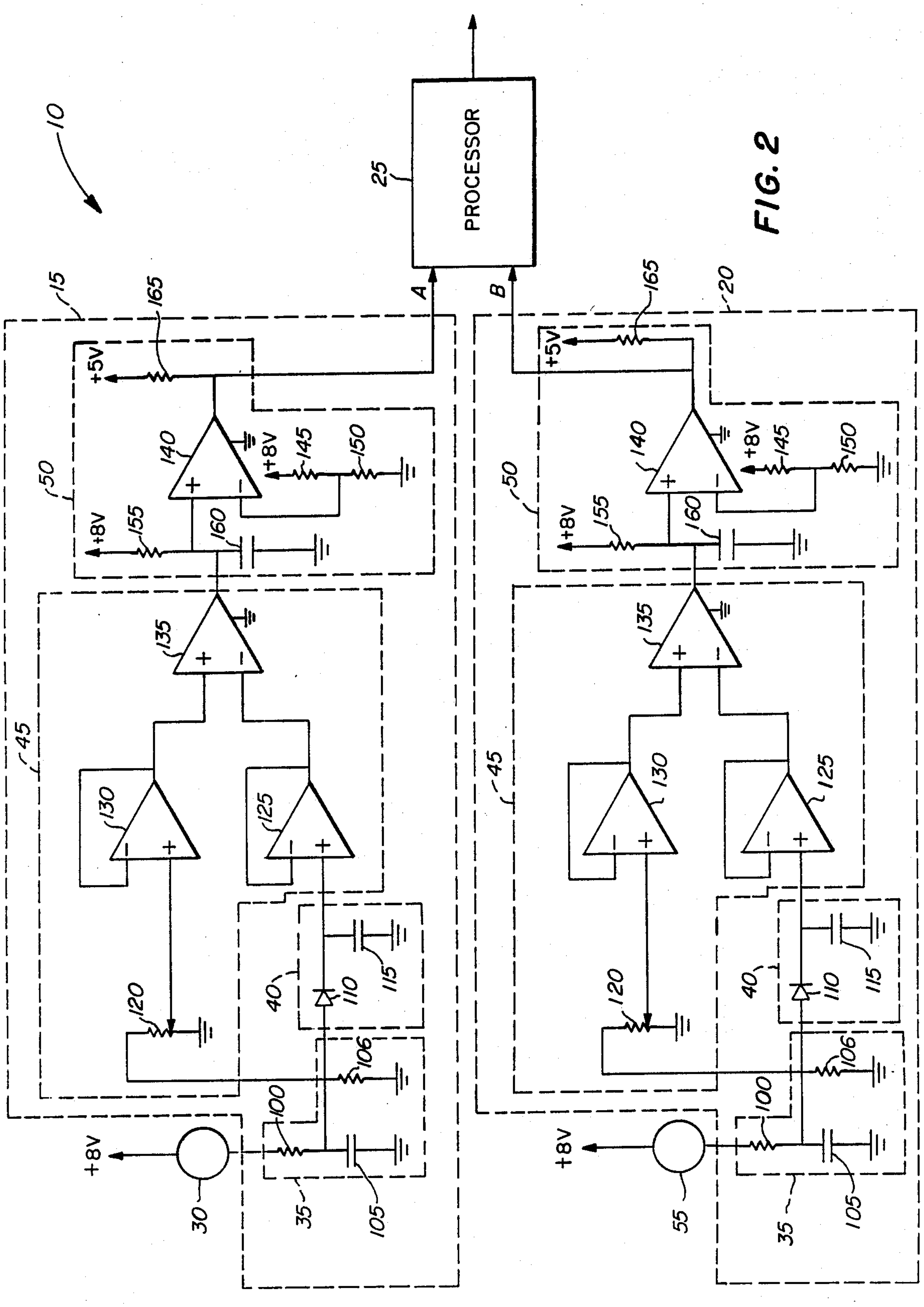
FIG. 2 is a schematic diagram of the present invention.

Considering motion detector 10 in greater detail, as illustrated in FIG. 2, detector 30 is connected to signal processing network 15 between a direct current power source and low pass filter 35 comprising resistor 100, which may have a resistance of 1 k ohms, connected in series with capacitor 105 having, for example, a capacitance of 1 microfarad. Filter 35 shunts transient voltages having frequencies slightly less than 40 Hz or higher through capacitor 105 to ground. Filter 35 also includes resistor 106, connected in parallel to capacitor 105, and enables capacitor 105 to charge, while allowing low frequency voltages to be provided to sample-and-hold 40 and comparator network 45. The resistance of resistor 106 may be 22 k ohms. The output of filter 35 is connected to sample-and-hold 40 at the input of diode 110. The output of diode 110 is connected to the positive input of analog amplifier 125 of comparator network 45. Capacitor 115, having a capacitance which may be 1 microfarad, is connected between the output of diode 110 and ground. The output of amplifier 125 is fed back to its negative input to provide amplifier 125 with unity gain. The output of filter 35 is also provided to comparator network 45 at variable resistor 120 which in turn is connected to the positive input of analog amplifier 130. The purpose of variable resistor 120 is to adjust the sensitivity of motion detector 10 so as to minimize false triggering while maintaining sufficient sensitivity to detect changes in background lighting most probably caused by an intrusion. The output of amplifier 135 is fed back to its negative input to provide amplifier 130 with unity gain. The outputs of amplifiers 125 and 135 are directed to the negative and positive inputs, respectively, of digital comparator 140. The purpose of amplifiers 120 and 130 is to buffer the inputs into digital comparator 135 and preserve circuit symmetry so as to eliminate dependence of the two voltages being compared by digital comparator 135 on temperature effects. The purpose of diode 110 is to prevent capacitor 115 from discharging back through filter 35 or through resistor 120.

Still referring to FIG. 2, the output of digital comparator 135 is connected to pulse stretcher 50 between resistor 155 and capacitor 160 and is directed to the positive input of digital comparator 140, as shown in FIG. 2. A reference voltage of approximately 1.7 volts is directed to the negative input of comparator 140, which by way of example, may be provided from a voltage divider consisting of resistors 145 and 150. It is to be understood that the scope of the invention also includes the use of a reference voltage source other than the voltage divider specifically described herein, as is would be well known by those skilled in this technology. Pulse stretcher 50 also includes resistor 155 connected between digital comparator 140 and processor 25, and the voltage source.

The above discussion of the physical description of signal processing network 15 is equally applicable to signal processing network 20, except that signal processing network 20 receives an output from detector 55 rather than from detector 30.

Figure 3:
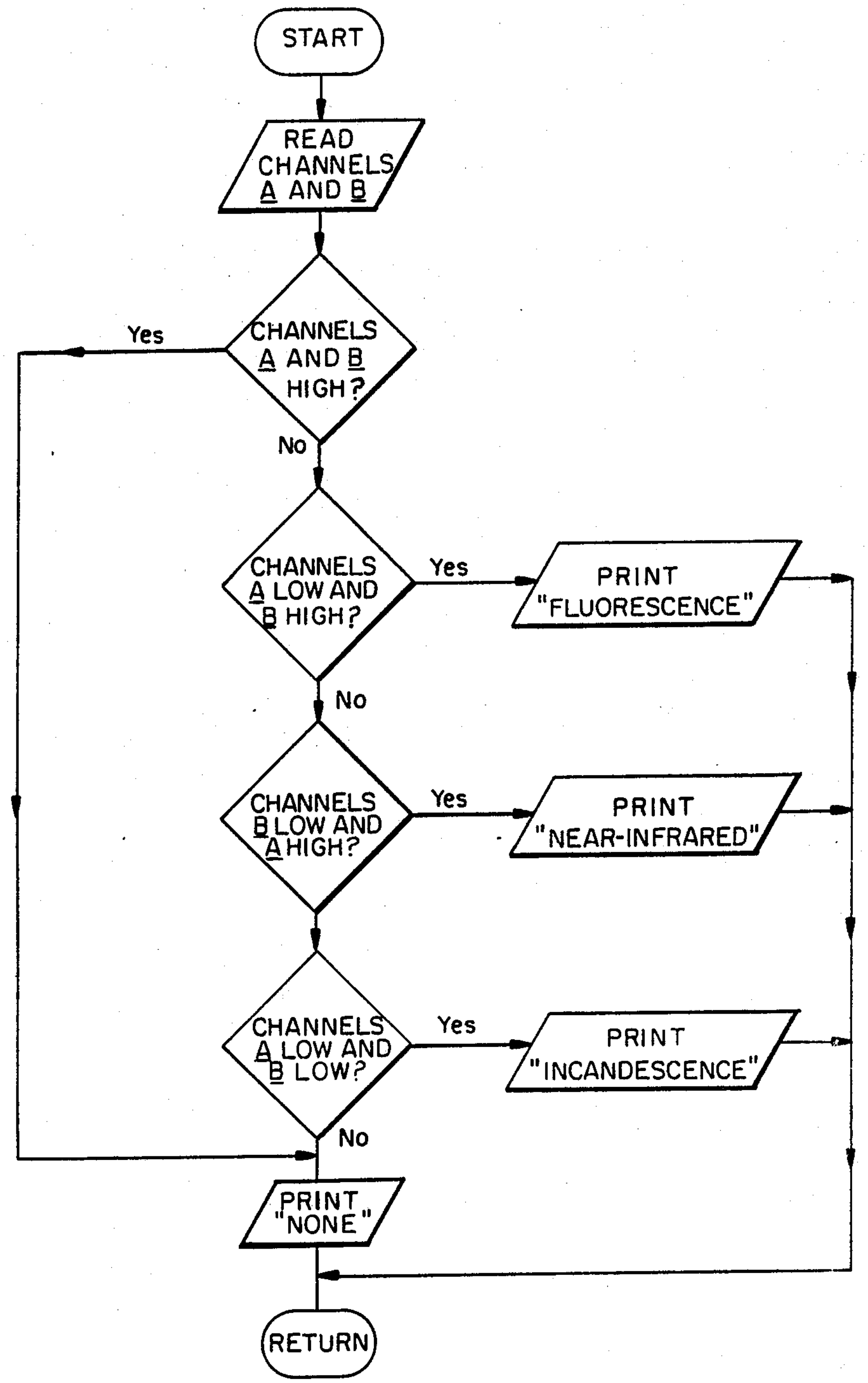
FIG. 3 is flow chart of the programming of the logical processor.

The outputs of digital comparators 140 of signal processing networks 15 and 20 are each provided to separate inputs, A and B, respectively, of logical processor 25, which may be a 6502-based single-board microcomputer such Model No. MMC-02, manufactured by R. J. Brachman, Assoc. Logical processor 25 is programmed in accordance with the flow chart shown in FIG. 3.

Analog amplifiers 130 and 125 may be type 741 or dual package type 1458. Digital comparators 135 and 140 may be type LM339.

OPERATION OF THE INVENTION

Initially, with regard to each signal processing network 15 and 20, filter 35 receives a voltage output from a detector, 30 or 55. The voltage output of filter 35, reduced slightly by the forward bias voltage drop across diode 110, charges capacitor 115 to a steady-state value which is provided to the positive input of amplifier 130. Thus, the voltage stored by capacitor 115 is a reference functionally related to the intensity of the detected scene light having the maximum intensity. The output voltage of filter 35 is attenuated by variable resistor 120 and provided to the positive input of amplifier 130. The resistance of variable resistor 120 is adjusted in order to set the sensitivity of motion detector 10 so that false trips are minimized while retaining sufficient sensitivity to detect anticipated stimuli resulting from active surveillance by near-infrared light or changes in background light levels associated with intrusions.

Where the detected background lighting does not diminish from the reference background, the voltage output of amplifier 130 is normally less than the output of amplifier 120. In this case, the output of digital comparator 135 will be an open circuit, allowing capacitor 160 to be charged at a rate determined by resistor 155 to an eventual voltage level corresponding to +8 volts, the power level voltage of the preferred embodiment. The instantaneous voltage of capacitor 160 is detected at the positive input of digital comparator 140. At steady-state conditions, the voltage output of digital comparator 135 will be greater than the 1.7 vdc reference voltage. Therefore, the output of digital comparator 140 will be an open circuit "high". In this case approximately 5 vdc will be provided through resistor 165 to the corresponding inputs, A and B of logical processor 25.

In a transient condition, where the detected intensity of scene lighting is less, by at least a predetermined minimum amount, than that of the normal ambient lighting corresponding to the reference voltage previously stored in capacitor 115, the voltages provided by amplifiers 130 and 125 to digital comparator 135 will be sufficiently different so as to cause the output of digital comparator 135 to go low. When this occurs, capacitor 160 of pulse stretcher 50 discharges through digital comparator 135. This causes the positive input of digital comparator 140 to be less than the reference voltage provided to its negative input. The output of digital comparator 140 becomes a logic "low", resulting in the voltage applied to resistor 165 to be shunted to ground and causing the previous 5 vdc input to logical processor 25 to change state to 0 vdc, signalling an alarm condition. When the difference between the inputs to digital comparator 135 becomes less than a predetermined limit, so that the output of digital comparator 135 becomes a logic "high", capacitor 160 charges to 8 vdc at a rate determined by the resistance of resistor 155 and the capacitance of capacitor 160. When the voltage on capacitor 160 as applied to the positive input of digital comparator 140 becomes greater than the reference voltage applied to its negative input, the output of digital comparator 140 goes "high", resulting in a 5 volt logic level being applied to the corresponding input of logical processor 25.

Processor 25 is disposed to receive the outputs of digital comparators 140. When the outputs of either or both digital comparators 140 change from high to low, processor 25 provides an output indicating detection of lighting background perturbations, as well as the type of background light which varied in intensity, i.e., near-infrared, fluorescent, or incandescent. Such perturbations correspond well with motion due to an intrusion. Furthermore, if either or both of the output states of digital comparators 140 change from high to low so that they are both low simultaneously, processor 25 provides an output indicating perturbation of detectors 30 and 55 with incandescent light. The outputs of logical processor may be provided to a display such as a printer, or serve as the inputs to another logical processor.

Obviously, many modifications and variations of the present invention are possible in light of the above teachings. It is therefore to be understood that within the scope of the appended claims the invention may be practiced otherwise than as specifically described.

What is claimed is:

1. An optical motion detector, comprising:

means for detecting visible light and for providing an output functionally related to the intensity of said visible light;

first signal processing network means operably coupled to receive said output of said visible light detecting means for providing an output corresponding to a change in intensity of said detected visible light from a visible light reference scene having a greatest detected intensity of said detected visible light;

means for detecting near-infrared light and for providing an output functionally related to the intensity of said near-infrared light;

second signal processing network means operably coupled to receive said output of said near-infrared light detecting means for providing an output corresponding to a change in intensity of said detected near-infrared light from a near-infrared light reference scene having a greatest detected intensity of said detected near-infrared light; and logical processor means operably coupled to said first and second signal processing network means for providing a motion detector warning output indicating a perturbation of visible light intensity in response to said detected change in visible light intensity, providing a motion detector warning output indicating a perturbation of near-infrared light intensity in response to said detected change in near-infrared light intensity, and providing a motion detector warning output indicating a perturbation of incandescent light intensity in response to said detection of said change in visible light intensity being detected simultaneously to said detection of said change in near-infrared light intensity.

2. The optical motion detector of claim 1 wherein: said first signal processing network means includes:

first filter means operably coupled to said visible light detecting means for shunting outputs having a frequency of about 40 hertz and higher from said visible light detecting means to a ground and for providing an output;

first sample-and-hold means operably coupled to receive said output of said first filter means for storing a value corresponding to said visible light reference scene;

first comparator network means operably coupled to receive said output of said first filter means and from said first sample-and-hold means for changing state when a difference between said value stored by said first sample-and-hold and said output of said visible light detecting means exceeds a predetermined limit, $\epsilon$; and first pulse stretcher means operably couple to said first comparator network means for providing an output to said logical processor when said first comparator network means changes said state;

said second signal processing network means includes:

second filter means operably coupled to said near-infrared light detecting means for shunting outputs having a frequency of about 40 hertz and higher from said near-infrared light detecting means to a ground and for providing an output;

second sample-and-hold means operably coupled to receive said output of said second filter means for storing a value corresponding to said near-infrared light reference scene;

second comparator network means operably coupled to receive said output of said second filter means and from said second sample-and-hold means for changing state when a difference between said value stored by said second sample-and-hold and said output of said near-infrared light detecting means exceeds said predetermined limit, $\epsilon$; and second pulse stretcher means operably coupled to said second comparator network means for providing an output to said logical processor when said second comparator network means changes said state.

3. The optical motion detector of claim 2 wherein: said first comparator network means includes:

a first resistor operably coupled to receive said output of said visible light detecting means;

a first amplifier operably coupled to said first resistor, said first amplifier providing an output;

a second amplifier operably coupled to said first sample-and-hold, said second amplifier providing an output; and a first comparator operably coupled to receive said outputs of said first and second amplifiers said second comparator network means includes:

a second resistor operably coupled to receive said output of said near-infrared light detecting means;

a third amplifier operably coupled to said second resistor, said third amplifier providing an output;

a fourth amplifier operably coupled to said second sample-and-hold, said fourth amplifier providing an output; and a second comparator operably coupled to receive said outputs of said third and fourth amplifiers.

4. The optical motion detector of claim 2 wherein: said visible light detecting means includes a photoelectric cell.

5. The optical motion detector of claim 2 wherein: said visible light detecting means includes a photodiode.

6. The optical motion detector of claim 2 wherein: said visible light detecting means includes a phototransistor.

7. The optical motion detector of claim 2 wherein: said near-infrared light detecting means includes a photoelectric cell.

8. The optical motion detector of claim 2 wherein: said near-infrared light detecting means includes a photodiode.

9. The optical motion detector of claim 2 wherein: said near-infrared light detecting means includes a phototransistor.

10. A method for detecting motion from a perturbated lighting scene and for identifying the type of perturbated lighting, comprising the steps of:

detecting an instantaneous visible light intensity from a lighting scene;

transducing said instantaneous visible light intensity into a first value functionally related to said visible light intensity;

storing a second value corresponding to a maximum detected intensity of said lighting scene;

determining a difference between said first and second values;

detecting an instantaneous near-infrared light intensity from said lighting scene;

transducing said instantaneous near-infrared light intensity into a third value functionally related to said near-infrared light intensity;

storing a fourth value corresponding to a maximum detected intensity of said near-infrared lighting scene;

determining a difference between said third and fourth values;

providing an intrusion warning output if said difference between said first and second values exceeds a predetermined limit, $\epsilon$, and providing an output indicating a perturbation of fluorescent light;

providing an intrusion warning output if said difference between said third and fourth values exceeds said predetermined limit, ε, and providing an output indicating a perturbation of near-infrared light; and providing an intrusion warning output and an output indicating a perturbation of incandescent light if each of said differences between said first and second values, and between said third and fourth values, exceed said predetermined limit, ε, and if said instantaneously detected visible light corresponding to said first value is detected substantially simultaneously to said detection of said near-infrared light corresponding to said third value.

11. An optical motion detector, comprising:

a first photodetector having an output functionally related to the intensity of visible light illuminating said photodetector;

a second photodetector having an output functionally related to the intensity of near-infrared light illuminating said photodetector;

a first signal processing network operably coupled to receive said output of said first photodetector, said first signal processing network including:

a first low-pass filter operably coupled to said first photodetector, said low pass filter providing an output having a frequency of about 40 hertz and less;

a first sample-and-hold operably coupled to receive said output of said first low-pass filter, said first sample-and-hold storing a value corresponding to a maximum detected intensity of said illumination of said first photodetector with said visible light;

a first comparator network operably coupled to receive said output of said first low-pass filter and said output of said first sample-and-hold, said first comparator including:

a first resistor operably coupled to receive said output of said first photodetector;

a first amplifier operably coupled to said first resistor, said first amplifier providing an output;

a second amplifier operably coupled to said first sample-and-hold, said second amplifier providing an output; and a first comparator operably coupled to receive said outputs of said first and second amplifiers, said first comparator changing state when a difference between said value stored by said first sample-and-hold and said output of said first photodetector exceeds a predetermined limit, a first pulse stretcher operably coupled to said first comparator, said first pulse stretcher changing state from a high to a low condition when said first comparator changes state from a high to a low condition;

a second signal processing network operably coupled to receive said output of said second photodetector, said second signal processing network including:

a second low-pass filter operably coupled to said second photodetector, said low pass filter providing an output having a frequency of about 40 hertz and less;

a second sample-and-hold operably coupled to receive said output of said second low-pass filter, said second sample-and-hold storing a value corresponding to a maximum detected intensity of said illumination of said second photodetector with said near-infrared light;

a second comparator network operably coupled to receive said output of said second low-pass filter and said output of said second sample-and-hold, said second comparator including:

a second resistor operably coupled to receive said output of said second photodetector;

a third amplifier operably coupled to said second resistor, said third amplifier providing an output;

a fourth amplifier operably coupled to said second sample-and-hold, said fourth amplifier providing an output; and a second comparator operably coupled to receive said outputs of said third and fourth amplifiers, said second comparator changing state when a difference between said value stored by said second sample-and-hold and said output of said second photodetector exceeds a predetermined limit;

a second pulse stretcher operably coupled to said second comparator, said second pulse stretcher changing state from a high to a low condition when said second comparator changes state from a high to a low condition; and a logical processor operably coupled to said first and second pulse stretchers, said logical processor providing an intrusion warning output indicating a change in intensity of fluorescent light, an intrusion warning output indicating said change in said intensity of said near-infrared light, and an intrusion warning output indicating a change in intensity of an incandescent light scene whenever said detected change in said intensity of said near-infrared light is detected substantially simultaneously with said detected change in intensity of said near-infrared light.

12. The optical motion detector of claim 11 wherein: said first photodetector is a photoelectric cell.

13. The optical motion detector of claim 11 wherein: said first photodetector is a photodiode.

14. The optical motion detector of claim 11 wherein: said first photodetector is a phototransistor.

15. The optical motion detector of claim 11 wherein: said second photodetector is a photoelectric cell.

16. The optical motion detector of claim 11 wherein: said second photodetector is a photodiode.

17. An optical motion detector, comprising:

means for detecting visible light intensity;

means for detecting near-infrared light intensity; and network means operably coupled to said visible light detecting means and said near-infrared light detecting means for providing an output warning indicating a change in intensity of fluorescent light, for providing an output warning indicating a change in intensity in said detected near-infrared light, and for providing an output warning indicating a change in intensity in incandescent light whenever said detected change in intensity of said visible light is detected simultaneously with said detected change in intensity of said near-infrared light.

18. The optical motion detector of claim 17 wherein: said visible light detecting means provides an output functionally related to the intensity of said visible light;

said near-infrared detecting means provides an output functionally related to the intensity of said near-infrared light;

said processor network includes:

first signal processing network means operably coupled to receive said output of said visible light detecting means for providing an output corresponding to a change in intensity of said detected visible light from a visible light reference scene having a greatest detected intensity of said detected visible light; and second signal processing network means operably coupled to receive said output of said near-infrared light detecting means for providing an output corresponding to a change in intensity of said detected near-infrared light from a near-infrared light reference scene having a greatest detected intensity of said detected near-infrared light; and a logical processor operably coupled to receive said outputs of said first and second signal processing network means for providing said output warnings.

19. The optical motion detector of claim 18 wherein:

said first signal processing network means provides said output whenever a difference between said intensity of said visible light reference scene and said intensity of said detected visible light exceeds a first predetermined limit; and said second signal processing network means provides said output whenever a difference between said intensity of said near-infrared light reference scene and said intensity of said detected near-infrared light exceeds a second predetermined limit.

20. The optical motion detector of claim 19 wherein:

said first signal processing network means includes:

first filter means operably coupled to said visible light detecting means for shunting outputs having a frequency of about 40 hertz and higher from said visible light detecting means to a ground and for providing an output;

first sample-and-hold means operably coupled to receive said output of said first filter means for storing a value corresponding to said visible light reference scene;

first comparator network means operably coupled to receive said output of said first filter means and from said first sample-and-hold means for changing state when a difference between said value stored by said first sample-and-hold and said output of said visible light detecting means exceeds a predetermined limit, $\epsilon$; and first pulse stretcher means operably coupled to said first comparator network means for providing an output to said logical processor when said first comparator network means changes said state;

said second signal processing network means includes:

second filter means operably coupled to said near-infrared light detecting means for shunting outputs having a frequency of about 40 hertz and higher from said near-infrared light detecting means to a ground and for providing an output;

second sample-and-hold means operably coupled to receive said output of said second filter means for storing a value corresponding to said near-infrared light reference scene;

second comparator network means operably coupled to receive said output of said second filter means and from said second sample-and-hold means for changing state when a difference between said value stored by said second sample-and-hold and said output of said near-infrared light detecting means exceeds said predetermined limit, $\epsilon$; and second pulse stretcher means operably coupled to said second comparator network means for providing an output to said logical processor when said second comparator network means changes said state.

21. The optical motion detector of claim 20 wherein:

said first comparator network means includes:

a first resistor operably coupled to receive said output of said visible light detecting means;

a first amplifier operably coupled to said first resistor, said first amplifier providing an output;

a second amplifier operably coupled to said first sample-and-hold, said second amplifier providing an output; and a first comparator operably coupled to receive said outputs of said first and second amplifiers said second comparator network means includes:

a second resistor operably coupled to receive said output of said near-infrared light detecting means;

a third amplifier operably coupled to said second resistor, said third amplifier providing an output;

a fourth amplifier operably coupled to said second sample-and-hold, said fourth amplifier providing an output; and a second comparator operably coupled to receive said outputs of said third and fourth amplifiers.

22. The optical motion detector of claim 21 wherein: said visible light detecting means includes a photoelectric cell.

23. The optical motion detector of claim 21 wherein: said visible light detecting means includes a photodiode.

24. The optical motion detector of claim 21 wherein: said visible light detecting means includes a phototransistor.

25. The optical motion detector of claim 21 wherein: said near-infrared light detecting means includes a photoelectric cell.

26. The optical motion detector of claim 21 wherein: said near-infrared light detecting means includes a photodiode.

27. The optical motion detector of claim 21 wherein: said near-infrared light detecting means includes a phototransistor.

* * * * *